United States Patent
Joyce et al.

(10) Patent No.: US 9,592,993 B2
(45) Date of Patent: Mar. 14, 2017

(54) CUSTOMIZED ELEVATOR PASSENGER INTERFACE

(75) Inventors: Matthew Joyce, Avon, CT (US); Ashley Chapman, Avon, CT (US); Osamu Sakai, Tchiba (JP); Jannah A. Stanley, Portland, CT (US); Vijay Jayachandran, West Hartford, CT (US); Baudelaire St. Louis, Meriden, CT (US)

(73) Assignee: Otis Elevator Company, Farmington, CT (US)

( * ) Notice: Subject to any disclaimer, the term of this patent is extended or adjusted under 35 U.S.C. 154(b) by 520 days.

(21) Appl. No.: 14/130,784

(22) PCT Filed: Jul. 15, 2011

(86) PCT No.: PCT/US2011/044155
§ 371 (c)(1),
(2), (4) Date: Jan. 3, 2014

(87) PCT Pub. No.: WO2013/012407
PCT Pub. Date: Jan. 24, 2013

(65) Prior Publication Data
US 2015/0045956 A1 Feb. 12, 2015

(51) Int. Cl.
*B66B 1/34* (2006.01)
*G06F 3/0484* (2013.01)
(Continued)

(52) U.S. Cl.
CPC ............ *B66B 1/3446* (2013.01); *B66B 1/468* (2013.01); *B66B 3/006* (2013.01); *G05B 15/02* (2013.01);
(Continued)

(58) Field of Classification Search
CPC ......... B66B 1/34; G06F 3/0484; G05B 15/02; G60F 3/0482
(Continued)

(56) References Cited

U.S. PATENT DOCUMENTS 5,056,629 A 10/1991 Tsuji et al.
6,550,586 B1 4/2003 Takeuchi
(Continued)

FOREIGN PATENT DOCUMENTS

CN 1286206 3/2001
EP 1308410 A1 5/2003
(Continued)

OTHER PUBLICATIONS

International Search Report and Written Opinion of the International Searching Authority for International application No. PCT/US2011/044155 dated Mar. 28, 2012.
(Continued)

*Primary Examiner* — Nam V Nguyen
(74) *Attorney, Agent, or Firm* — Carlson, Gaskey & Olds

(57) ABSTRACT

An exemplary elevator passenger interface device includes a passenger communication component that facilitates communications between a passenger and an elevator system. Such communications include passenger input to request elevator service and information provided to the passenger. A controller controls the passenger communication component to control its functionality including providing selected information to the passenger. The controller includes a customization module configured to change the functionality of the passenger communication component responsive to authorized user input that is distinct from the passenger input. The authorized user input includes a selection of at
(Continued)

least one of a feature used to present information to a passenger or a feature used to allow a passenger to request elevator service.

13 Claims, 1 Drawing Sheet

(51) Int. Cl.
| | | |
|---|---|---|
| *G05B 15/02* | (2006.01) | |
| *G06F 3/0482* | (2013.01) | |
| *B66B 1/18* | (2006.01) | |
| *B66B 1/46* | (2006.01) | |
| *B66B 3/00* | (2006.01) | |

(52) U.S. Cl.
CPC ........ *G06F 3/0482* (2013.01); *G06F 3/04842* (2013.01); *B66B 2201/463* (2013.01); *B66B 2201/4615* (2013.01)

(58) Field of Classification Search
USPC ............. 340/5.31, 5.21; 187/382, 388, 391; 455/566
See application file for complete search history.

(56) References Cited

U.S. PATENT DOCUMENTS

| | | | |
|---|---|---|---|
| 6,801,792 B1 | 10/2004 | Schuster et al. | |
| 6,868,945 B2 | 3/2005 | Schuster et al. | |
| 6,988,071 B1 | 1/2006 | Gazdzinski | |
| 7,040,458 B2* | 5/2006 | Forsythe | B66B 1/34 187/389 |
| 7,093,693 B1* | 8/2006 | Gazdzinski | B66B 1/468 187/384 |
| 7,319,966 B2 | 1/2008 | Friedli et al. | |
| 7,353,915 B2* | 4/2008 | Zaharia | B66B 1/468 187/388 |
| 7,404,469 B2* | 7/2008 | Takeuchi | B66B 1/463 187/380 |
| 7,469,772 B2* | 12/2008 | Takeuchi | B66B 3/02 187/381 |
| 7,500,544 B2* | 3/2009 | Hakala | B66B 1/463 187/382 |
| 7,711,565 B1* | 5/2010 | Gazdzinski | B66B 3/00 187/396 |
| 7,793,762 B2 | 9/2010 | Zaharia et al. | |
| 7,841,452 B2* | 11/2010 | Sansevero | B66B 1/46 187/382 |
| 7,854,300 B2* | 12/2010 | Nakashima | B66B 3/00 187/382 |
| 9,126,806 B2* | 9/2015 | Joyce | B66B 1/2458 |
| 9,238,568 B2* | 1/2016 | Nonami | B66B 1/468 |
| 9,272,877 B2* | 3/2016 | Nakashima | B66B 1/468 |
| 2002/0130905 A1 | 9/2002 | Hughes et al. | |

FOREIGN PATENT DOCUMENTS

| | | |
|---|---|---|
| JP | 6144726 A | 5/1994 |
| JP | 7179275 | 7/1995 |
| JP | 08119543 | 5/1996 |
| JP | 2001302119 | 10/2001 |
| JP | 2001328775 | 11/2001 |
| JP | 2004277119 A | 10/2004 |
| JP | 2006103881 A | 4/2006 |
| JP | 2007238232 A | 9/2007 |
| JP | 2010208775 A | 9/2010 |
| WO | 9608437 | 3/1996 |
| WO | 0044662 | 8/2000 |
| WO | 2006041467 A1 | 4/2006 |
| WO | 2006112812 A3 | 10/2006 |
| WO | 2011024292 A1 | 3/2011 |

OTHER PUBLICATIONS

Chinese Search Report for Chinese Application No. 201180072301.X, dated Jul. 22, 2014.
Examination Report under Section 18(3) for Application No. GB1401082.1 dated Dec. 2, 2015.
International Preliminary Report on Patentability for International application No. PCT/US2011/044155 dated Jan. 30, 2014.

* cited by examiner

CUSTOMIZED ELEVATOR PASSENGER INTERFACE

BACKGROUND

Elevator systems have been in use for many years. Passengers have traditionally used hall call buttons for requesting elevator service. Typical hall call button arrangements include an up button and a down button that a passenger selects to indicate the direction in which they desire to travel. Upon entering the elevator car, the passenger uses a car operating panel to indicate the floor to which they wish to be carrier.

More recently, destination entry systems have been introduced that allow passengers to enter their desired destination prior to boarding an elevator car. A variety of techniques at managing how destination entry devices facilitate passengers placing requests for elevator service have been proposed. For example, it has become possible to integrate destination entry with building access so that an individual's elevator service request is automatically made when they present a credential that allows them to enter a building. It has also become possible to present passengers with a selection of intended destinations that are different from the floor levels.

SUMMARY

An exemplary elevator passenger interface device includes a passenger communication component that facilitates communications between a passenger and an elevator system. Such communications include passenger input to request elevator service and information provided to the passenger. A controller controls the passenger communication component to control its functionality including providing selected information to the passenger. The controller includes a customization module configured to change the functionality of the passenger communication component responsive to authorized user input that is distinct from the passenger input. The authorized user input includes a selection of at least one of a feature used to present information to a passenger or a feature used to allow a passenger to request elevator service.

In one example the controller restricts which destinations are presented on a display during corresponding time periods according to the authorized user input. The controller only accepts passenger input corresponding to a destination presented on the display during the corresponding time period.

In another example, the communication component includes a keypad that facilitates passenger input to request elevator service. The controller controls the functionality of the keypad keys. The authorized user input includes an indicator of keypad key functionality that is different for each of a plurality of time periods. The controller restricts which keys are functional and what their functionality is during corresponding time periods according to the authorized user input. The controller only accepts passenger input corresponding to the prescribed keypad functionality during the corresponding time period.

In another example the communication component includes an audio output device that. The authorized user input includes an indicator of audio clips to play back that are different for each of a plurality of time periods.

Another exemplary elevator passenger interface device includes a display that facilitates passenger input to request elevator service. A controller controls the display to provide selected information to the passenger. The controller includes a customization module configured to change an appearance of the display responsive to authorized user input that is distinct from the passenger input. An external customization module at a location remote from a building in which the passenger interface device is installed is remotely accessible by the authorized user. The external customization module facilitates the authorized user making selected changes to the appearance of the display.

The various features and advantages of a disclosed example will become apparent to those skilled in the art from the following detailed description. The drawings that accompany the detailed description can be briefly described as follows.

DETAILED DESCRIPTION

Figure 1:
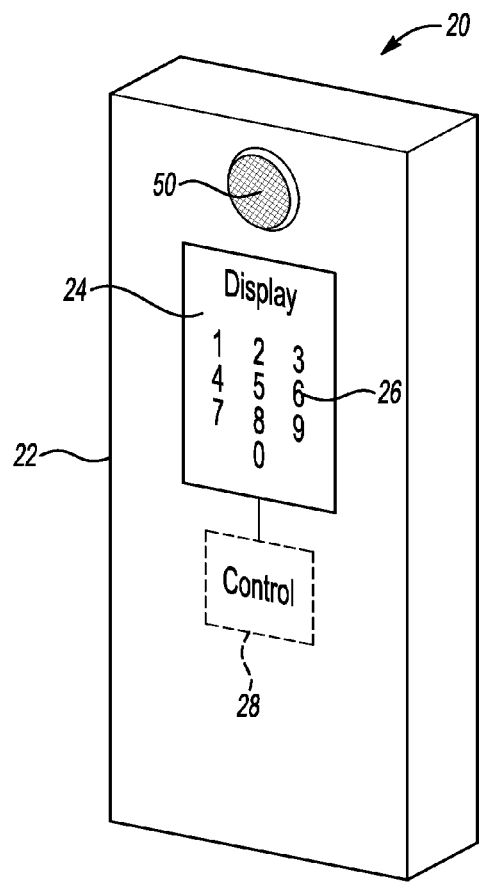
FIG. 1 schematically illustrates a passenger interface device designed according to an embodiment of this invention.

FIG. 1 schematically illustrates a passenger interface device 20. At least one communication component facilitates communications between a passenger and the associated elevator system such as allowing a passenger to request elevator service and providing information to a passenger. For discussion purposes, a display, a keypad or other input component and a speaker or other audio output component are used as example communication devices. In the following description each of those will be discussed although this invention is not necessarily limited to a specific communication component.

In the example of FIG. 1, a housing or frame 22 supports a display 24 that provides information to facilitate passenger input to request elevator service. In this example the display 24 comprises a touch screen that includes images or soft keys 26 that allow a passenger to make a request for elevator service. In the illustration, the images 26 comprise numbers that allow a passenger to enter the number of the floor to which they desired to be carried by an elevator car. The passenger interface device 20 in this example is a destination entry device that allows the passenger to provide an indication of a desired destination before the passenger enters an elevator car. The housing or frame 22 may be situated in an elevator lobby on an entry level of a building, for example.

A controller 28 controls the content of the display 24 and communicates information regarding passenger input requesting elevator service to an elevator group control or dispatcher (not illustrated) so that the associated elevator system can provide the desired service.

The controller 28 is configured to provide unique control features over the display 24 that allows a user (such as a customer or building owner) to customize the appearance of the display 24 to satisfy the user's preferences and any particular needs associated with facilitating passenger input to the elevator system.

The controller 28 may be supported by the housing or frame 22. In some examples the controller 28 is located remotely from the display 24.

Figure 2:
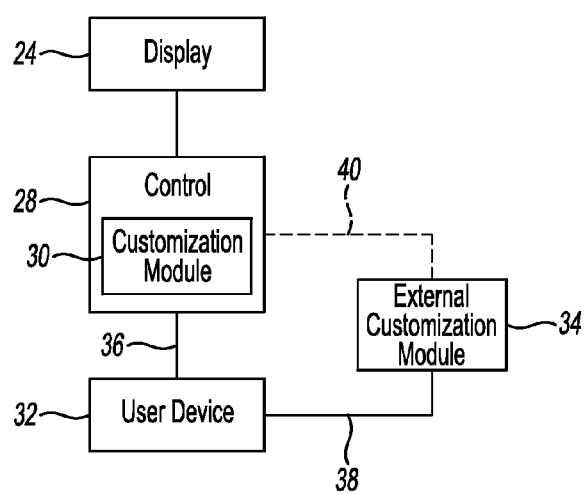
FIG. 2 schematically illustrates schematic features of an example passenger interface device designed according to an embodiment of this invention.

FIG. 2 schematically shows an arrangement of a passenger interface device that allows a user to customize the appearance of the display 24. In this example, the controller 28 includes a customization module 30 that is configured to change an appearance of the display responsive to input from an authorized user. FIG. 2 schematically shows a user device 32, such as a computer, that allows an authorized user to provide indications of the desired appearance of the display 24.

The example in FIG. 2 includes an external customization module 34, which in some examples is located remotely from the building in which the passenger interface device 20 has been installed. The external customization module 34 in one example is an application or a server that is accessible by an authorized user that facilitates making changes to the appearance of the display 24. The external customization module 34 in some examples provides an authorized user with a plurality of pre-selected background images or appearances, passenger input images or soft keys that may be selected from a variety of preconfigured images and facilitates an authorized user arranging the content on the display in a desired manner, for example.

In some examples, the user device 32 communicates directly with the customization module 30 over a communication link 36 that may be established using known technology. The communication link 36 may be line based or wireless. In some such examples, there is no exterior customization module 34.

The user device 32 in some examples communicates with the external customization module 34 over a communication link 38. In one example, the external customization module 34 is accessible over the Internet. The example of FIG. 2 includes the possibility that the external customization module 34 communicates directly with the customization module 30 over a communication link 40. Such communications may occur over a line-based connection or wirelessly, for example. In such examples, the authorized user provides indications of how the customized display 24 should look and the external customization module 34 provides the corresponding information to the customization module 30 so the controller 28 controls the display 24 according to the authorized user's input.

The illustrated example allows for customizable control over the display 24 and the operation of the passenger interface 20. For example, an authorized user can select at least one of the backgrounds presented on the display 24 or an indicator of an available destination (e.g., an image 26) presented on the display 24.

The authorized user can set a schedule for altering the appearance of the display. This allows for changing the appearance of the display throughout the course of a day, or according to the seasons, for example. In one example, the background of the display 24 is different for each of a plurality of time periods such as segments of a day. In the morning hours, the display 24 may appear different than in late afternoon or evening hours, for example. In addition to altering the background, the content provided on the display may be altered.

For example, at some times of the day weather conditions may be useful to elevator passengers, while at other times of the day local business advertisements may be useful. An authorized user may select the content of the display 24 according to a desired schedule set by that user.

Another customizable aspect of the interface device 20 is that the display 24 can be controlled to display only selected possible destinations according to a schedule set by an authorized user. This allows for controlling the functionality of the features on the display such as the virtual keypad 26 in the illustrated example. In some buildings, for example, it is desirable to restrict access to certain levels during certain times. For building levels that are not available in the evening and nighttime hours, the authorized user input instructs the controller 28 to limit the possible destinations shown on the display 24 so that destinations that are not available at a particular time are not displayed at that time. This prevents an individual from expecting to receive elevator service to a level that is not accessible at a particular time. The controller 28 will not accept input for a destination that is not available on the display 24 under such circumstances in some examples. This allows for the passenger interface device 20 to be integrated with a building security system that controls access over particular areas within a building during particular times, for example.

Another customizable aspect of the interface device 20 is that audible information provided through a speaker 50, for example, can be controlled to play back certain recordings according to a schedule set by an authorized user. In some buildings, for example, it is desirable to restrict access to certain levels during certain times. For building levels that are not available in the evening and nighttime hours, the authorized user input instructs the controller 28 to provide an audio message that indicates that a level is not available. This allows for the passenger interface device 20 to be integrated with a building security system that controls access over particular areas within a building during particular times, for example. In another example, the interface device plays back certain warning or informational messages depending on the passenger's destination.

Figure 3:
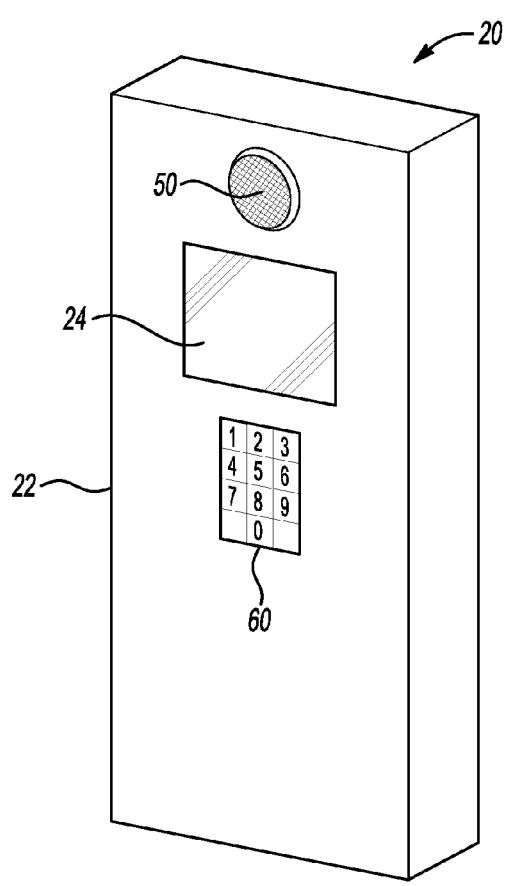
FIG. 3 schematically illustrates another passenger interface device designed according to an embodiment of this invention.

FIG. 3 shows another example passenger interface device 20. This example differs from the example of FIG. 1 by including a dedicated keypad 60 separate from the display 24 rather than incorporating a keypad on the display as show in FIG. 1. In this example, an authorized user can set a schedule for altering the functionality of the keys of the keypad 60, which is useful, for example, in destination entry devices. This allows for changing the functionality of the keypad 60 throughout the course of a day, or according to a weekday or holiday schedule, for example. In one example, the programmable keys can be associated with different destinations or qualifiers depending on the date and time. In lunch hours, a selected key (e.g., the "*" key) may represent a shortcut for the cafeteria floor whereas in the evening, it may represent a shortcut for the lobby, for example. In another example, the entire keypad may become inert during non-work hours, with only selected keys (e.g., the "*" key) available to take the user to the lobby. In another example, the numeric keys on the keypad may be associated with destinations, similar to a "hot key" function.

An authorized user may set a schedule and a corresponding desired display, audio or keypad functionality for each of a plurality of time periods so that the controller 28 automatically controls the display 24, speaker 50, keypad 60 or a combination of two or more of these according to the authorized user input. The customizable features of the disclosed example enhance an elevator passenger's experience, and allow a passenger to quickly understand how access to portions of a building is limited, if at all, at different times. The customization module 30 or the external customization module 34 make it possible for an authorized user to control the ability of passengers to enter requests and the visual and audible information provided to a passenger according to the user's needs and desires.

The various features and the various functionalities that are discussed above are combinable according to the needs of a given situation even if they are discussed above as being within a specific embodiment. In other words, the aspects of the disclosed examples may be combined to realize still further embodiments.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elevator passenger interface device, comprising:
   a communication component that facilitates communications between a passenger and an associated elevator system, the communications comprising at least one of passenger input to request elevator service and information provided to the passenger, the communication component being a destination entry device that is situated to allow the passenger to provide an indication of a desired destination before the passenger enters an elevator car; and
   a controller that controls a functionality of the communication component, the controller including a customization module configured to change the functionality of the communication component responsive to authorized user input that is distinct from the passenger input, the authorized user input including a selection of at least one of a feature used to present information to a passenger or a feature used to allow a passenger to request elevator service,
   and wherein
      the communication component comprises a display and the controller controls the display to provide selected information to the passenger
      the customization module provides an authorized user with a plurality of pre-selected background appearances and a plurality of preconfigured passenger input images to be displayed on the display to facilitate the authorized user arranging content on the display in a desired manner;
      the passenger input images presents only destinations that are available according to a schedule set by the authorized user;
      the controller accepts passenger input only corresponding to a presented destination;
      the background appearance is scheduled to be different for each of a plurality of time periods; and
      the interface device is integrated with a building security system that controls access over particular areas within a building during particular times.

2. The device of claim 1, wherein the authorized user input comprises a schedule for altering the functionality of the selected feature.

3. The device of claim 1, wherein the authorized user input dictates that the background is different for each of a plurality of segments of a day.

4. The device of claim 1, wherein the authorized user input
   directs that the indicator of an available destination is different for each of a plurality of segments of a day, and
   restricts which destinations are presented on the display during corresponding time periods.

5. The device of claim 1, wherein the customization module is configured to communicate with a user device through which the authorized user provides the authorized user input.

6. The device of claim 1, wherein the customization module is configured to communicate with an external customization module at a location remote from a building in which the communication component is installed, the external customization module providing the authorized user input.

7. The device of claim 1, comprising an external customization module at a location remote from a building in which the communication component is installed, the external customization module being remotely accessible by the authorized user, the external customization module facilitating the authorized user making selected changes to the functionality of the communication component.

8. The device of claim 7, wherein the external customization module is accessible over the Internet.

9. The device of claim 7, wherein the external customization module provides the authorized user with a plurality of preconfigured features that are selectable to be included in the functionality of the communication component.

10. The device of claim 1, wherein the communication component comprises a keypad that facilitates the passenger requesting elevator service and the authorized user input includes selecting particular times during which selected keys of the keypad may be used by a passenger to request elevator service.

11. The device of claim 1, wherein the communication component comprises a keypad that facilitates the passenger requesting elevator service and the authorized user input includes assigning a desired function to at least one key of the keypad for at least a selected time.

12. The device of claim 1, wherein the communication component comprises an audio output component and the authorized user input comprises audible content to be provided to a passenger.

13. The device of claim 12, wherein the authorized user input comprises a schedule during which the audible content will be available to a passenger.

* * * * *

UNITED STATES PATENT AND TRADEMARK OFFICE
CERTIFICATE OF CORRECTION

| | |
|---|---|
| PATENT NO. | : 9,592,993 B2 |
| APPLICATION NO. | : 14/130784 |
| DATED | : March 14, 2017 |
| INVENTOR(S) | : Matthew Joyce et al. |

Page 1 of 1

It is certified that error appears in the above-identified patent and that said Letters Patent is hereby corrected as shown below:

In the Claims

In Claim 4, Column 6, Line 6; after "directs that" replace "the indicator" with --the indication--

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*